Sept. 8, 1964

L. A. HANNULA 3,148,246

TELEPHONE ENCLOSURE PANEL

Filed Sept. 19, 1962

3 Sheets-Sheet 1

INVENTOR.
Leslie A. Hannula
BY
Darbo, Robertson & Vandenburgh
Attys

Sept. 8, 1964 L. A. HANNULA 3,148,246

TELEPHONE ENCLOSURE PANEL

Filed Sept. 19, 1962 3 Sheets-Sheet 2

INVENTOR.

Leslie A. Hannula

BY

Darbo, Robertson & Vandenburgh

Att'ys

Sept. 8, 1964 L. A. HANNULA 3,148,246

TELEPHONE ENCLOSURE PANEL

Filed Sept. 19, 1962 3 Sheets-Sheet 3

INVENTOR.
Leslie A. Hannula
BY
Darbo, Robertson & Vandenburgh
Att'ys

United States Patent Office 3,148,246

Patented Sept. 8, 1964

3,148,246

TELEPHONE ENCLOSURE PANEL

Leslie A. Hannula, Waukegan, Ill., assignor to Burgess-Manning Company, Libertyville, Ill., a corporation of Illinois Filed Sept. 19, 1962, Ser. No. 224,739
5 Claims. (Cl. 179—6.3)

This invention relates to enclosures for pay telephones and more particularly refers to a decorative panel structure for enclosing and protecting the telephone instrument itself.

It is an object of the invention to provide an enclosure panel for a pay telephone which covers those parts of the telephone not required to be used in placing a call for improved appearance and protection from unauthorized access.

It is a further object to provide such a structure in which the operational parts of the phone such as the handset, the dial, and the coin fixtures are mounted exposed on the panel which is hinged from a support and normally kept locked.

It is a prime object of the invention to provide an enclosure panel of the type described having means provided to permit the coin return receptacle of the telephone to protrude therethrough, and to provide means for closely framing the coin receptacle so that no object may be inserted into the telephone while, at the same time, permitting relative lateral movement between the door and the protruding receptacle as the panel is swung open on its hinge.

Other objects and advantages of the invention will become apparent from the following discussion and drawings in which.

Figure 1:
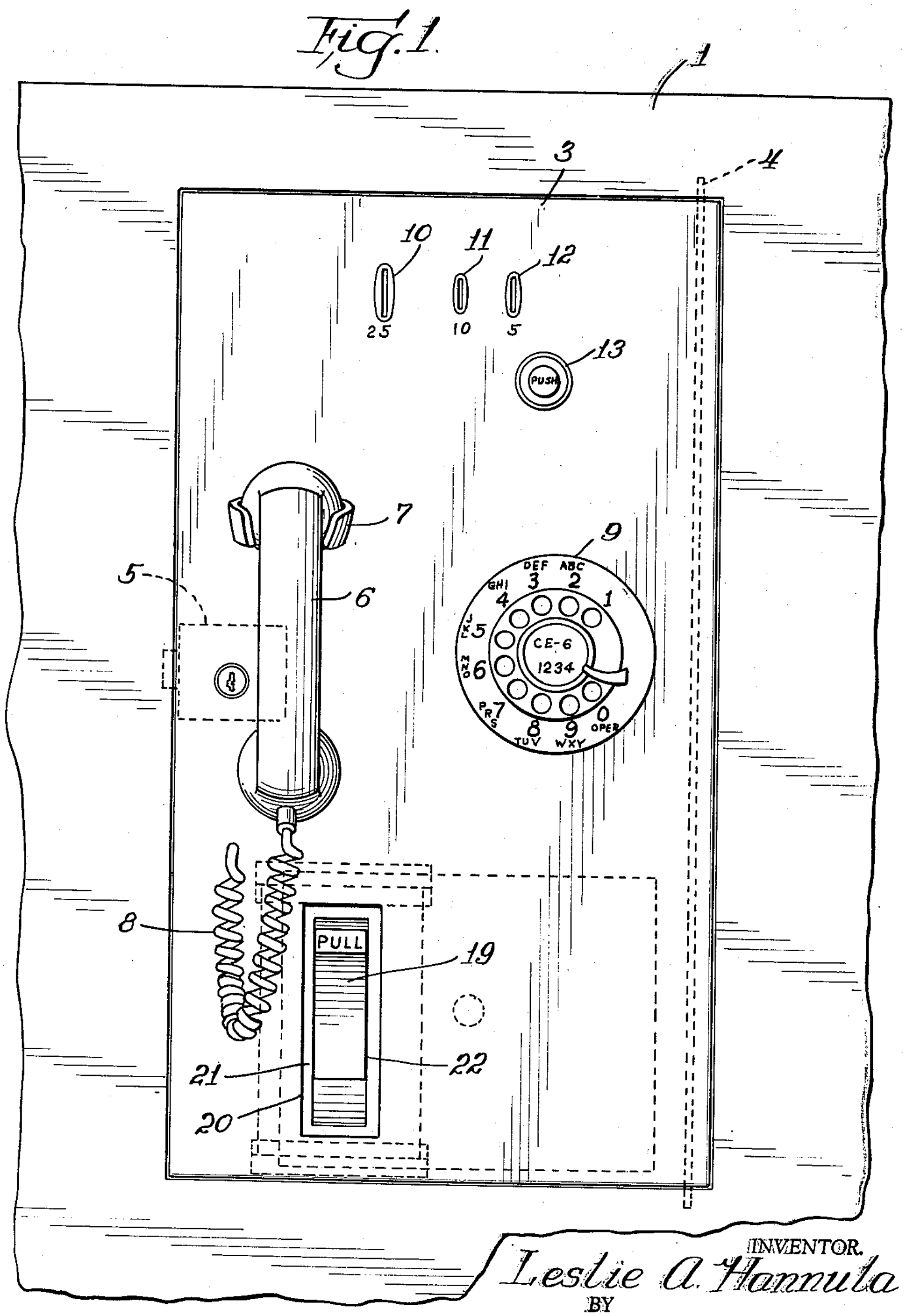
FIG. 1 is a front elevational view of the telephone pay station enclosure panel showing telephone components mounted thereon.
Figure 2:
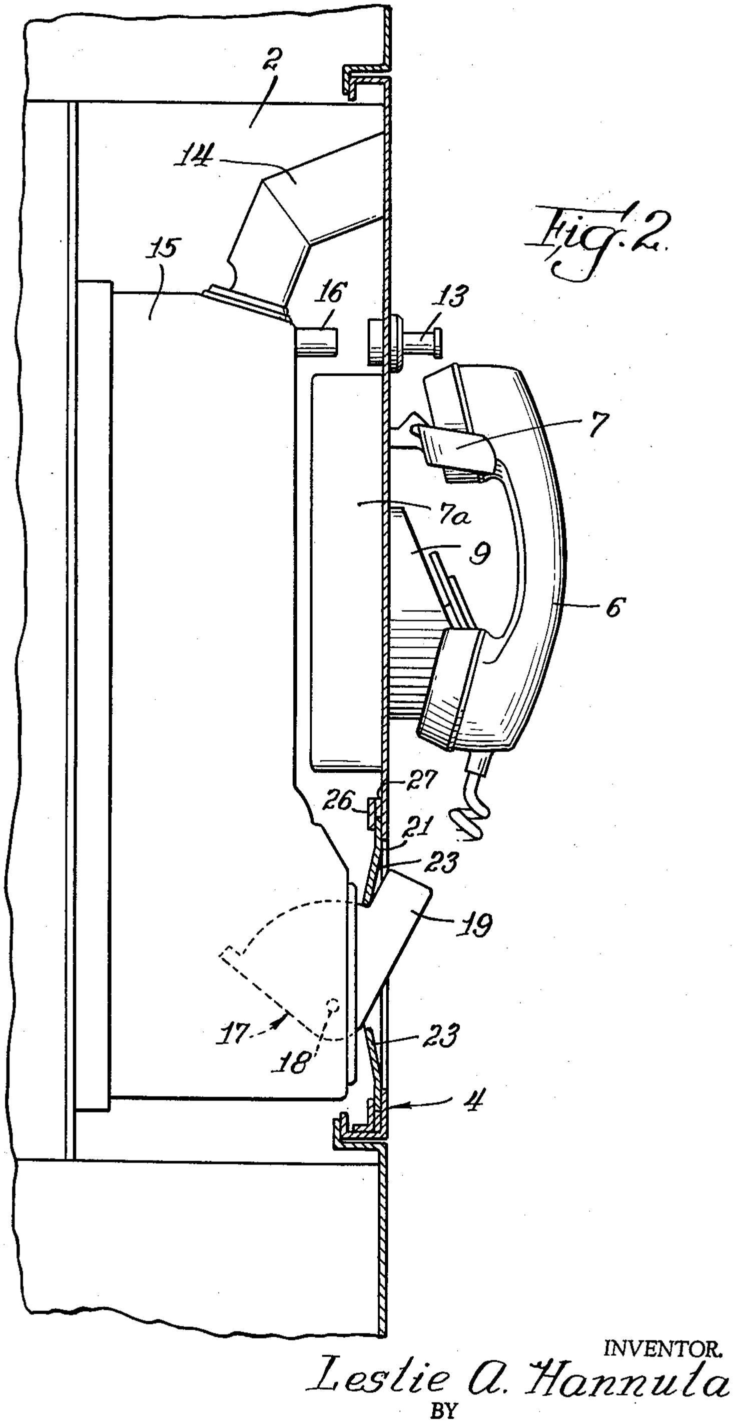
FIG. 2 is a cross-sectional view of the enclosure.

Referring to FIGS. 1 and 2, a frame 1, supported from a wall, not shown, of a telephone booth defines an entrance 2 for the telephone 15. A panel 3, support from frame 1 by a hinge 4 closes the opening in frame 1. The panel is normally kept secured by a lock 5 which may be opened only by authorized personnel having a key therefor. Mounted on the outside of the panel is a telephone transmitter and receiver handset 6 supported by a switch-actuating hanger 7 connected to an internal switch 7a, and having a line cord 8 one end of which extends through a hole in the panel and connects with the internal mechanism of the telephone. A dial assembly 9 is mounted at one side of the handset assembly 6. Coin slots 10, 11 and 12, and a coin release push button 13 are provided at the top of the panel. A coin duct 14 provides means for transporting the coins to the coin actuating mechanism 15. Release of the coins is provided by depressing the coin release button 13 which in turn depresses the inner coin release 16. A coin return receptacle 17 is mounted on a hinged pin 18, and has external portion 19 which may be lowered in order to retrieve coins which have been released for return. A slot 20 is provided in the panel 3 through which the coin return receptacle 17 protrudes.

Immediately behind the panel 3 at the area of the slot

20 is a slide plate 21 having a slot 22 which closely encompasses the coin return receptacle 19. The slide plate has an angle portion 23 designed to permit the receptacle 19 to rotate freely to both limiting positions.

Figure 3:
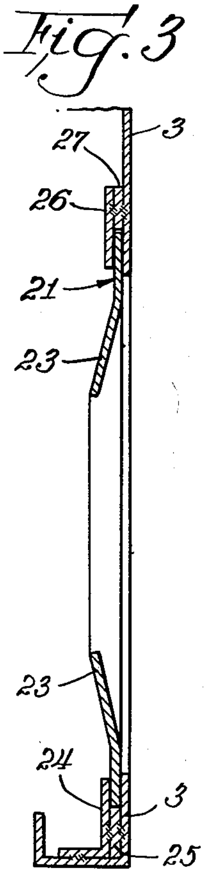
FIG. 3 is an enlarged cross-sectional view of a portion of the panel of the enclosure shown in FIG. 2.
Figures 4, 5, 6:
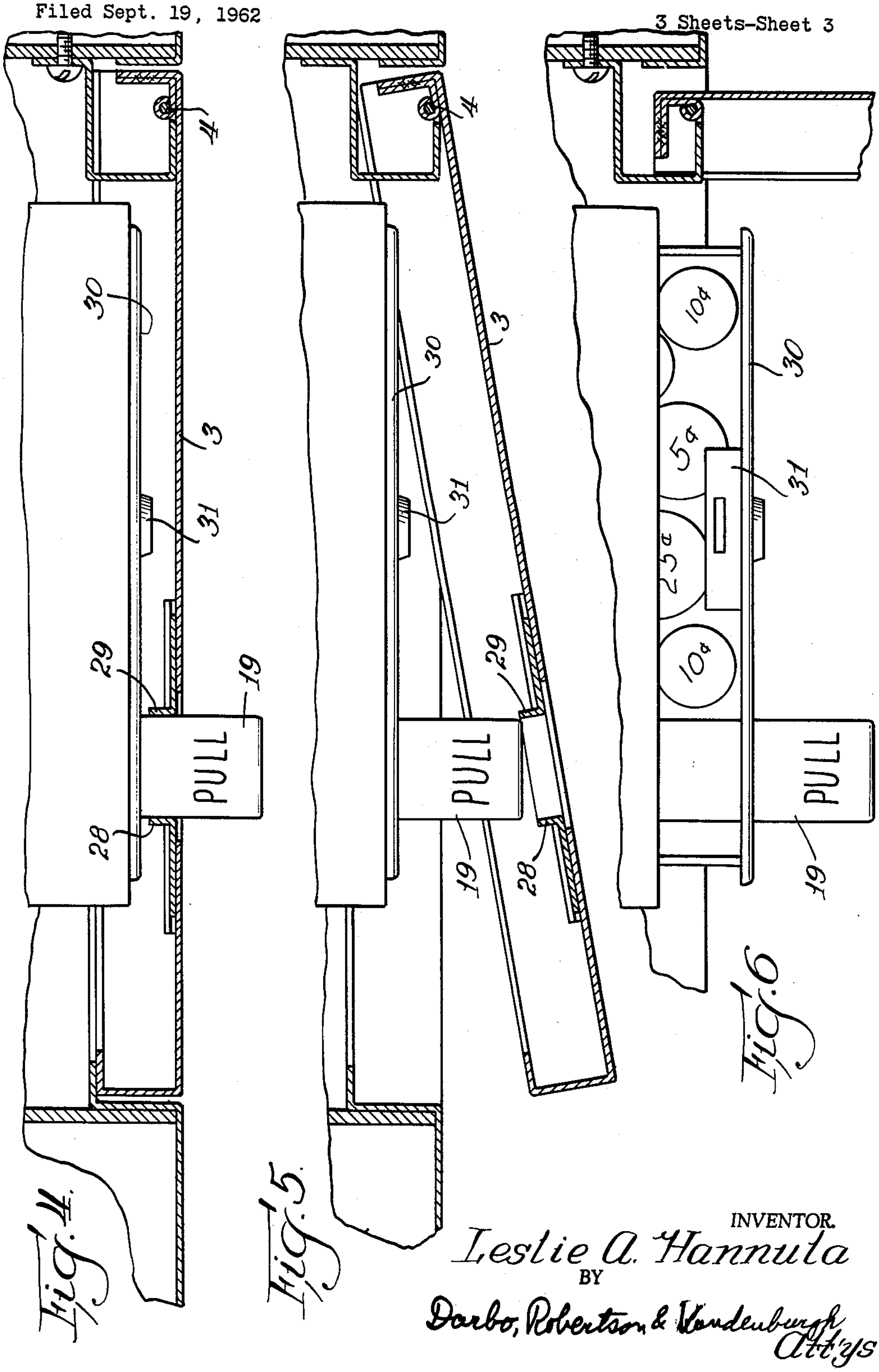
FIG. 4 is a cross-sectional view of the panel of the enclosure taken at the line 4—4 of FIG. 2 and showing the panel in closed position.
FIG. 5 is a cross-sectional view similar to that of FIG. 4 showing the panel in partially opened position.
FIG. 6 is a cross-sectional view similar to that of FIGS. 4 and 5 showing the door completely open and the coin drawer partially pulled out.

The slide plate structure and its support are shown in greater detail in FIG. 3. The bottom of the slide plate 21 is supported by an angle retainer 24 maintained in spaced relation from the panel 3 by a spacer 25. The edge of the slide plate rides on the upper edge of the spacer 25. The top edge of the slide plate is held by a retainer 26 supported by a spacer 27. The supporting means described permits the slide plate 21 to slide laterally. The slide plate is so constructed that the portions engaging the receptacle 19 have wings 28 and 29 bent rearward at a 90° angle to provide a broad engaging surface for the receptacle.

Behind the panel 3 is provided a cash compartment drawer assembly 30 which contains the deposited coins. A lock 31 secures the assembly during normal use.

The structure according to the invention is so arranged that all facilities for the normal operation of the telephone are exposed and operable while the panel 3 is maintained locked in order to prevent tampering with the internal mechanism and cash drawer. Normal use of the coin return receptacle 19 is permitted through the slot 22 provided in the slide plate. However, the close fitting slide plate protects the internal structure of the telephone by preventing the insertion of objects or instruments around the receptacle.

When the panel 3 opens about its hinge 4, every point in the door describes an arc having a radius equal to its distance from the hinge. The receptacle 19 is fixed to the inner portion of the telephone and does not move with the door. If the slot 22 surrounding the protruding receptacle 19 were fixed on the panel, it would catch on the receptacle as it moved laterally in respect thereto while describing its arc. If the slot in the panel were to be enlarged to the degree necessary to clear the receptacle, this would introduce the danger that access could be gained to the interior of the compartment. According to the present invention, a removable slide plate 27 is provided which permits the slot 22 to move laterally in relation to the panel in order to follow and clear the receptacle. By this means protection against unauthorized access to the interior of the compartment is provided by the slide plate.

The present invention has a number of advantages. It permits a telephone to be placed in a recess provided in a wall of a telephone booth, and the telephone to be covered by a panel which permits only the parts of the telephone necessary for normal operation to be exposed. A highly decorative and aesthetic arrangement is thus attained. The panel covering the recess may be easily opened by means of a lock and key for servicing the telephone or removing accumulated coins. Protection is provided in the area of the coin return receptacle by the plate 21 which is so arranged that its slot closely surrounds the receptacle 19, and whereby the plate may slide laterally in order to clear the receptacle when the panel is swung open on its hinge. The structure is relatively inexpensive to assemble and is completely fool-proof.

Although the present invention has been described in terms of only a single embodiment, many variations of the invention may be practiced by those skilled in the art without departing from the spirit and scope of the invention as defined by the appended claims.

Invention is claimed as follows:

1. In a device comprising a panel hinge-mounted at its edge on a frame for pivotal movement about an axis, a protruding member fixed with respect to said frame and protruding through an aperture provided therefor in said panel, the improvement wherein the aperture in said panel is dimensioned substantially larger than the cross-section of said protruding member as measured perpendicular to said axis, and comprising means movably mounted on said panel completely masking said aperture except for a slot provided in said means closely dimensioned about said protruding member, said means being arranged to slide in a direction substantially perpendicular to the axis about which said panel swings, whereby when said panel is opened, said means slides laterally with respect to said panel to permit said protruding member to be cleared.

2. In a device comprising a panel hinge-mounted at its edge on a frame for pivotal movement about an axis, a coin return receptacle fixed with respect to said frame and protruding through an aperture provided therefor in said panel, the improvement wherein the aperture in said panel is dimensioned substantially larger than the cross-section of said coin return receptacle, and wherein a plate member is mounted on said panel and arranged to slide in a direction substantially perpendicular to the axis about which said panel swings, said plate member having a slot provided therein closely contoured to the cross-sectional dimensions of said coin return receptacle, whereby when said panel is opened, said plate slides laterally with respect to said panel to permit said coin return receptacle to be cleared.

3. In an assembly comprising an enclosure having a panel hinge-mounted at one edge for pivotal movement about a vertical axis and including a pay telephone having a portion fixedly mounted within said enclosure and an external portion mounted on the outer surface of said panel comprising a hand set, a switch hook and a dial mechanism, and a coin return receptacle mounted on the stationary portion of said telephone assembly inside said enclosure and protruding through an aperture provided in said panel, the improvement wherein the aperture in said panel is dimensioned substantially larger than the cross-section of the portion of said coin return receptacle which protrudes therethrough, and wherein a slide plate is mounted on said panel over said aperture having a slot therein closely dimensioned to the cross-sectional dimensions of said receptacle, and means for supporting said slide plate and permitting it to slide laterally on said panel, whereby when said panel is opened, the relative lateral motion between said panel and said receptacle causes said plate to slide laterally and to clear said receptacle.

4. An assembly according to claim 3 wherein the means for supporting said slide plate comprises a pair of spacer and retainer sub-assemblies, one supporting the upper edge of said plate and one supporting the lower edge of said slide plate.

5. An assembly according to claim 3 wherein the upper and lower edges of said plate at said slot are angled inwardly to provide sufficient freedom for said receptacle to rotate about its axis.

References Cited in the file of this patent

UNITED STATES PATENTS 2,758,257 Wills ------------------ Aug. 7, 1956